US012730517B2

(12) United States Patent
Cui et al.

(10) Patent No.: US 12,730,517 B2
(45) Date of Patent: Sep. 8, 2026

(54) HAPTIC INTERACTION INFORMATION PROCESSING METHOD AND APPARATUS AND DEVICE

(71) Applicant: BOE Technology Group Co., Ltd., Beijing (CN)

(72) Inventors: Tenghe Cui, Beijing (CN); Qian Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/996,639

(22) PCT Filed: Feb. 21, 2024

(86) PCT No.: PCT/CN2024/077852
§ 371 (c)(1),
(2) Date: Jan. 17, 2025

(87) PCT Pub. No.: WO2024/179334
PCT Pub. Date: Sep. 6, 2024

(65) Prior Publication Data

US 2025/0271936 A1 Aug. 28, 2025

(30) Foreign Application Priority Data

Feb. 27, 2023 (CN) ......................... 202310212530.1

(51) Int. Cl.
*G06F 3/01* (2006.01)

(52) U.S. Cl.
CPC .................................... *G06F 3/016* (2013.01)

(58) Field of Classification Search
CPC .................................. G06F 3/016; G06F 3/01
See application file for complete search history.

(56) References Cited

FOREIGN PATENT DOCUMENTS

| | | | |
|---|---|---|---|
| CN | 101996413 | A | 3/2011 |
| CN | 110096136 | A | 8/2019 |

(Continued)

OTHER PUBLICATIONS

Blind Watermarking Algorithm Based on 3 Dimensional Model Embedded Gray Image, Wuhan University of Technology, 2009, with English Abstract. (57 pages).

(Continued)

*Primary Examiner* — Scott D Au
(74) *Attorney, Agent, or Firm* — WHDA, LLP

(57) ABSTRACT

Haptic interaction information processing methods, apparatuses and devices are provided, wherein the haptic interaction information processing method according to an embodiment of the present disclosure includes: counting a quantity of waveforms of haptic interaction signals in a target video picture, wherein the target video picture is a video picture in a target video, and the waveform of one haptic interaction signal corresponds to haptic interaction information of one video picture region in the target video picture; and generating a gray-scale information characterization map corresponding to the target video picture according to the quantity of the waveforms of the haptic interaction signals, wherein the gray-scale information characterization map is configured to characterize distribution positions of video picture regions in the target video picture.

19 Claims, 4 Drawing Sheets

(56) References Cited

FOREIGN PATENT DOCUMENTS

| | | | | | |
|---|---|---|---|---|---|
| CN | 111258432 B | * | 4/2021 | ............... | G06T 7/12 |
| KR | 20120130971 A | * | 12/2012 | ............. | G06F 21/36 |

OTHER PUBLICATIONS

Extended (Supplementary) European Search Report dated May 7, 2026, issued in counterpart EP Application No. 24763017.1. (10 pages).

Kim, Y. et al., A Tactile Glove Design and Authoring System for Immersive Multimedia, Future Article, IEEE Service Center, vol. 17, No. 3, 2010, p. 34-45. (12 pages); cited in Extended European Search Report dated May 7, 2026.

Lin, J. et al., A Handy Image Explorer with Tactile Feedback for Diagnostic Imaging, Broadband, Wireless Computing, Communication and Applicantions, 2012, p. 316-321. (6 pages); cited in Extended European Search Report dated May 7, 2026.

* cited by examiner

```
11111111111111 22222222222222
11111111111111 22222222222222
11111111111 000000 22222222222
111111111 0000000000 222222222
11111111 00000000000 222222222
1111111 000000000000 22222222
1111111 000000000000 22222222
11111111 000000000000 22222222
11111111 000000000000 22222222
111111111 0000000000 2 22222222
1111111111 0000000 222 22222222
11111111111111 22222222222222
11111111111111 22222222222222
```

Acquiring and decoding a haptic characterization information stream corresponding to a target video to obtain a gray-scale information characterization map corresponding to each of a plurality of video pictures in the target video and encoded haptic interaction information corresponding to the plurality of video pictures — S201

In response to detecting a haptic interaction operation for a target video picture in the plurality of video pictures, determining a gray-scale information characterization map corresponding to the target video picture from the gray-scale information characterization maps corresponding to the plurality of video pictures — S202

Determining gray-scale information corresponding to the haptic interaction operation according to the gray-scale information characterization map corresponding to the target video picture and a video picture region where the haptic interaction operation is located — S203

Determining haptic interaction information corresponding to the haptic interaction operation from haptic interaction information corresponding to waveforms of a plurality of haptic interaction signals corresponding to the target video picture according to the gray-scale information corresponding to the haptic interaction operation — S204

Triggering a corresponding haptic actuator to output the haptic interaction information corresponding to the haptic interaction operation — S205

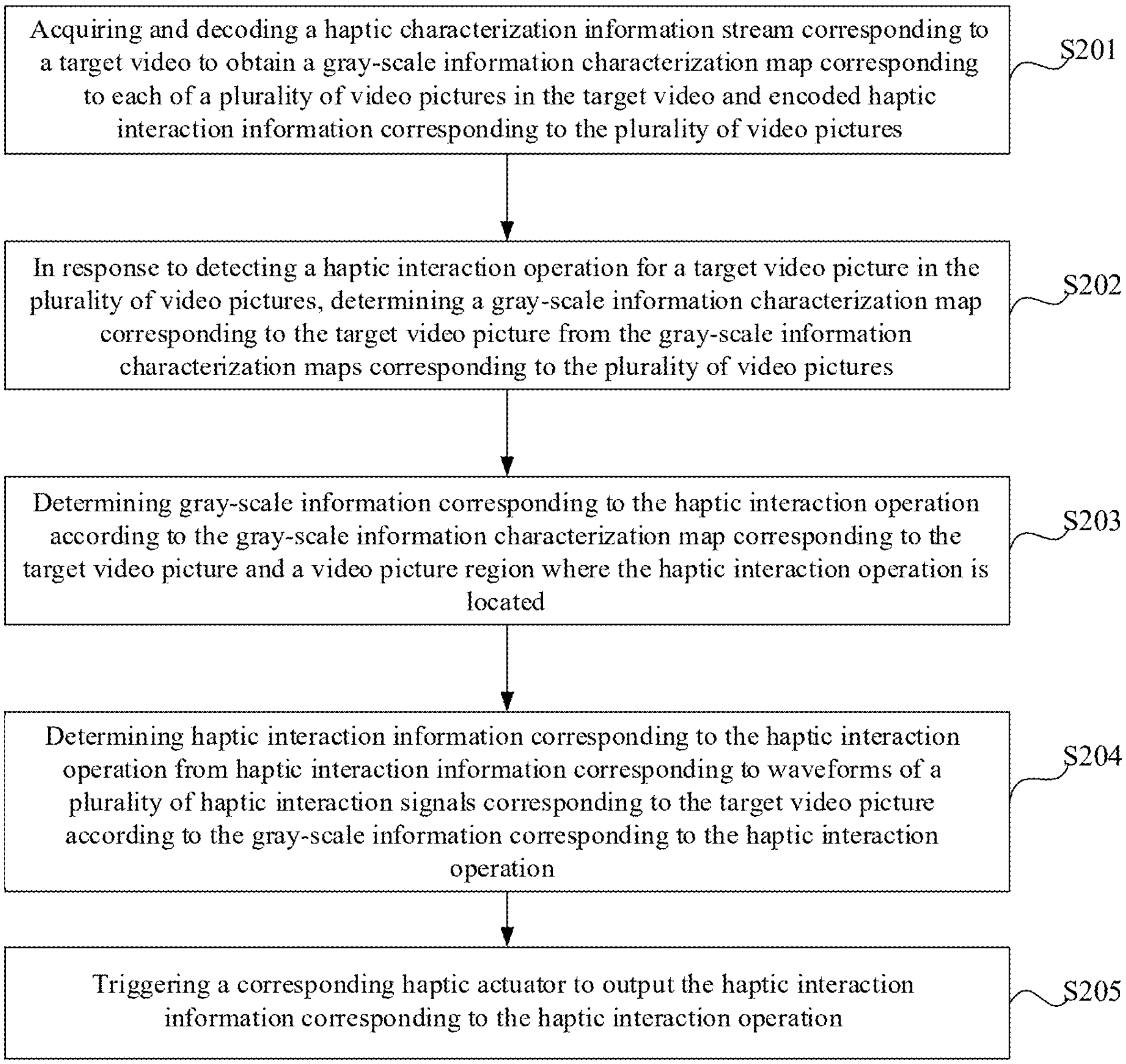

FIG. 6

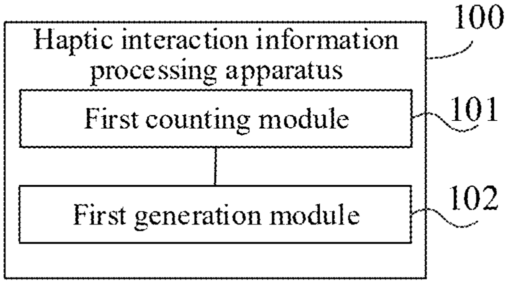

FIG. 7

HAPTIC INTERACTION INFORMATION PROCESSING METHOD AND APPARATUS AND DEVICE

CROSS-REFERENCE TO RELATED APPLICATION

This application claims the priority of the Chinese Patent application filed on Feb. 27, 2023 before the China National Intellectual Property Administration with the application quantity of 202310212530.1, and the title of "HAPTIC INTERACTION INFORMATION PROCESSING METHOD AND APPARATUS AND DEVICE", which is incorporated herein in its entirety by reference.

FIELD

The present disclosure belongs to the field of haptic signal expression and, more particularly, to haptic interaction information processing methods, apparatuses and devices.

BACKGROUND

In the optical disc image file (ISO) base media file format (ISOBMFF), haptics is proposed as a first-order media type equivalent to audio and video, and haptics is also proposed as a supplement to the motion picture expert group-dynamic adaptive streaming over hyper text transfer protocol (HTTP) (MPEG-DASH) standard, which will make the DASH streaming client aware of the presence of haptics in the ISOBMFF segment. However, this way can only meet the requirement of single haptic interaction setting of a single picture.

SUMMARY

In a first aspect, a haptic interaction information processing method is provided, including:

- counting the quantity of waveforms of haptic interaction signals in a target video picture, wherein the target video picture is a video picture in a target video, and the waveform of one haptic interaction signal corresponds to haptic interaction information of one video picture region in the target video picture; and
- generating a gray-scale information characterization map corresponding to the target video picture according to the quantity of waveforms of the haptic interaction signals, wherein the gray-scale information characterization map is configured to characterize distribution positions of video picture regions in the target video picture.

In a second aspect, a haptic interaction information processing method is provided, including:

- acquiring and decoding a haptic characterization information stream corresponding to a target video to obtain a gray-scale information characterization map corresponding to each of a plurality of video pictures in the target video and encoded haptic interaction information corresponding to the each of the plurality of video pictures, wherein the gray-scale information characterization map corresponding to one video picture is configured to characterize distribution positions of video picture regions in the video picture, and waveforms of haptic interaction signals corresponding to one video picture correspond to haptic interaction information of video picture regions in the video picture;
- in response to detecting a haptic interaction operation for a target video picture in the plurality of video pictures, determining a gray-scale information characterization map corresponding to the target video picture from the gray-scale information characterization maps corresponding to the plurality of video pictures;
- determining gray-scale information corresponding to the haptic interaction operation according to the gray-scale information characterization map corresponding to the target video picture and a video picture region where the haptic interaction operation is located;
- determining haptic interaction information corresponding to the haptic interaction operation from haptic interaction information corresponding to waveforms of a plurality of haptic interaction signals corresponding to the target video picture according to the gray-scale information corresponding to the haptic interaction operation; and
- triggering a corresponding haptic actuator to output the haptic interaction information corresponding to the haptic interaction operation.

In a third aspect, a haptic interaction information processing apparatus is provided, including:

- a first counting module configured to count a quantity of waveforms of haptic interaction signals in a target video picture, wherein the target video picture is a video picture in a target video, and the waveform of one haptic interaction signal corresponds to haptic interaction information of one video picture region in the target video picture; and
- a first generation module configured to generate a gray-scale information characterization map corresponding to the target video picture according to the quantity of the waveforms of the haptic interaction signals, wherein the gray-scale information characterization map is configured to characterize distribution positions of video picture regions in the target video picture.

In a fourth aspect, a haptic interaction information processing apparatus is provided, including:

- a first processing module configured to acquire and decode a haptic characterization information stream corresponding to a target video to obtain a gray-scale information characterization map corresponding to each of a plurality of video pictures in the target video and encoded haptic interaction information corresponding to the each of the plurality of video pictures, wherein the gray-scale information characterization map corresponding to one video picture is configured to characterize distribution positions of video picture regions in the video picture, and waveforms of haptic interaction signals corresponding to one video picture correspond to haptic interaction information of video picture regions in the video picture;
- a second processing module configured to, in response to detecting a haptic interaction operation for a target video picture in the plurality of video pictures, determine a gray-scale information characterization map corresponding to the target video picture from the gray-scale information characterization maps corresponding to the plurality of video pictures;
- a third processing module configured to determine gray-scale information corresponding to the haptic interaction operation according to the gray-scale information characterization map corresponding to the target video picture and a video picture region where the haptic interaction operation is located;

a fourth processing module configured to determine haptic interaction information corresponding to the haptic interaction operation from haptic interaction information corresponding to waveforms of a plurality of haptic interaction signals corresponding to the target video picture according to the gray-scale information corresponding to the haptic interaction operation; and a fifth processing module configured to trigger a corresponding haptic actuator to output the haptic interaction information corresponding to the haptic interaction operation.

In a fifth aspect, a haptic interaction information processing device is provided, including a processor and a memory; the memory storing a program or an instruction executable on the processor, and the program or the instruction, when executed by the processor, implementing the steps of the haptic interaction information processing method according to the first aspect.

In a sixth aspect, a haptic interaction information processing device is provided, including a processor and a memory; the memory storing a program or an instruction executable on the processor, and the program or the instruction, when executed by the processor, implementing the steps of the haptic interaction information processing method according to the second aspect.

In a seventh aspect, a computing processing device is provided, including:

a memory storing a computer-readable code; and one or more processors; when the computer-readable code is executed by the one or more processors, the computing processing device performing the haptic interaction information processing method according to the first aspect or the second aspect.

In an eighth aspect, a computer program is provided, including a computer-readable code which, when run on a computing processing device, causes the computing processing device to perform the haptic interaction information processing method according to the first aspect or the second aspect.

In a ninth aspect, a computer-readable medium having stored thereon the computer program according to the eighth aspect.

In a tenth aspect, a haptic interaction information processing system is provided, including: a video production device and a video playing device. The video production device is configured to perform the steps of the haptic interaction information processing method in the first aspect, and the video playing device is configured to perform the steps of the haptic interaction information processing method in the second aspect.

In an eleventh aspect, a readable storage medium having stored thereon a program or an instruction, the program or the instruction, when executed by a processor, implements the steps of the haptic interaction information processing method according to the first aspect or implements the steps of the haptic interaction information processing method according to the second aspect.

In a twelfth aspect, a chip is provided, including a processor and a communication interface. The communication interface is coupled to the processor, and the processor is configured to execute a program or an instruction to implement the steps of the haptic interaction information processing method according to the first aspect or implement the steps of the haptic interaction information processing method according to the second aspect.

In a thirteenth aspect, a computer program/program product is provided, which is stored in a storage medium. The computer program/program product is executed by at least one processor to implement the steps of the haptic interaction information processing method according to the first aspect or the second aspect.

The above description is only a summary of technical schemes of the present disclosure, which can be implemented according to contents of the specification in order to better understand technical means of the present disclosure; and in order to make the above and other objects, features and advantages of the present disclosure more obvious and understandable, detailed description of the present disclosure is particularly provided in the following.

BRIEF DESCRIPTION OF THE DRAWINGS

In order to more clearly illustrate the embodiments of the present disclosure, the drawings required to be used in the embodiments will be briefly introduced below. Obviously, the drawings described below are only some embodiments of the present disclosure, and a person skilled in the art may obtain other drawings according to these drawings without involving any inventive effort.

FIG. 6 is a flowchart of another haptic interaction information processing method in an embodiment of the present disclosure;

FIG. 7 is a block diagram of a structure of a haptic interaction information processing apparatus in an embodiment of the present disclosure;

DETAILED DESCRIPTION

Figure 1:
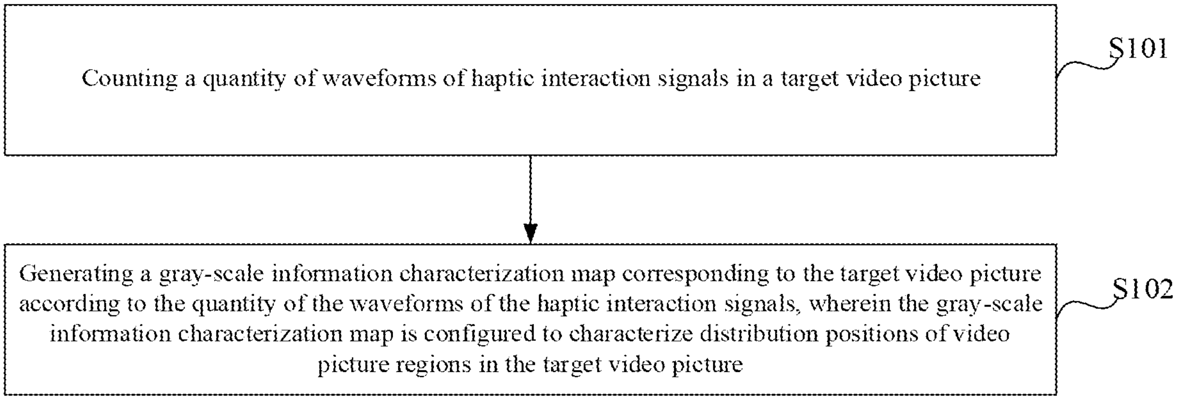
FIG. 1 is a flowchart of a haptic interaction information processing method in an embodiment of the present disclosure.

In order to make the object, technical solutions, and advantages of the embodiments the present disclosure clearer, the technical solutions in the embodiments of the present disclosure will be clearly and completely described below in conjunction with the accompanying drawings in the embodiments of the present disclosure. Obviously, the described embodiments are only some embodiments of the present disclosure, not all embodiments. Based on the embodiments of the present disclosure, all other embodiments obtained by a person skilled in the art without involving inventive effort fall within the scope of the present disclosure.

The terms “first”, “second”, and the like in the specification and claims of the present disclosure are used for distinguishing similar objects and are not used for describing a particular order or sequence. It can be understood that the terms so used are interchangeable under appropriate circumstances so that the embodiments of the present disclosure can be implemented in an order other than those illustrated or described herein. In addition, the objects distinguished by "first" and "second" are usually of one type, and the quantity of objects is not limited. For example, the first object may be one or at least two. In addition, "and/or" in the specification and claims indicates at least one of the connected objects, and the character "/" generally indicates an "or" relationship between the objects it connects.

Haptic technologies provide ways of entertainment and sensory immersion in addition to audio and video media. Taking media streams such as streaming media games and mobile advertising as an example, the user's experience and enjoyment for the media content may be significantly enhanced by adding haptics to the audio/video content of the media streams.

To this end, in the ISOBMFF, haptics has been proposed as a first-order media type equivalent to audio and video, and haptics is also proposed as a supplement to the MPEG-DASH standard, which will make the DASH streaming client aware of the presence of haptics in the ISOBMFF segment. However, this way can only meet the requirement of single haptic interaction setting of a single picture, but cannot meet the requirement of different haptic interaction settings of different regions of the picture.

For the problems existing in the related art, the present disclosure designs a gray-scale characterization method for a haptic interaction signal position in a video picture region, and gray-scale information is used to divide a target video picture into regions according to waveforms of the haptic interaction signals, so that a playing device can retrieve the haptic interaction signals corresponding to the positions of the regions according to the gray-scale information in the gray-scale information characterization map subsequently, which provides an embodiment basis for different haptic interaction settings of different regions of the picture (such as regional haptic interaction settings of an array motor or haptic interaction settings similar to mono/stereo audio transmission) and can improve the interactivity and entertainment of the video picture.

In a first aspect, referring to FIG. 1, it is a flowchart of a haptic interaction information processing method provided by an embodiment of the present disclosure. The method may include the following steps:

S101: counting the quantity of waveforms of haptic interaction signals in a target video picture.

The target video picture is a video picture in a target video, and the waveform of one haptic interaction signal corresponds to haptic interaction information of one video picture region in the target video picture.

In a specific embodiment, it is considered that for a video (i.e., the target video) including haptic dimension information, the quantity of haptic interaction signals of different waveforms included in each video picture in the video and picture regions corresponding to the waveforms of the haptic signals may be similar or different due to different haptic interaction settings of a designer. Therefore, counting the quantity of the waveforms of the haptic interaction signals in the target video picture is beneficial to subsequently allocating resources (such as gray-scale values) to video picture regions in the target video picture, thereby enabling regional feedback descriptions of the haptic dimension information of the target video picture.

S102: generating a gray-scale information characterization map corresponding to the target video picture according to the quantity of the waveforms of the haptic interaction signals, wherein the gray-scale information characterization map is configured to characterize distribution positions of video picture regions in the target video picture.

In a specific embodiment, a video production device can perform S101 to S102 described above and use the gray-scale information to characterize corresponding regions (i.e., the video picture regions) of the haptic interaction signals of different waveforms in the target video picture, so that the encoding cost can be effectively reduced on the basis of satisfying the requirement of different haptic interaction settings of different regions of the picture. It can be understood that the above-mentioned regional haptic dimension information characterization manner is also applicable to the characterization of dimension information such as audio (such as mono/stereo), video (such as an interactive picture), and smell.

From the above-mentioned steps, it can be seen that the distribution positions of the video picture regions in the target video picture are characterized by the gray-scale information characterization map in an image grayscale manner, which can accurately describe the regions where the haptic interaction signals of different waveforms are located in the target video picture and is beneficial to realizing different haptic interaction settings in different regions of the picture.

Embodiment 1

An example of counting the quantity of the waveforms of the haptic interaction signals in the target video picture is described by the present embodiment.

Haptic interaction information corresponding to each of pixel points in the target video picture is determined. A region formed by a plurality of pixel points having a mapping relationship among the corresponding haptic interaction information is determined as a video picture region. The quantity of the waveforms of the haptic interaction signals is determined according to a determined quantity of the video picture regions.

A region formed by a plurality of pixel points not corresponding to the haptic interaction information is a non-video picture region, and the mapping relationship is used for: determining a haptic interaction signal amplitude of a second pixel point according to attribute information between a first pixel point and the second pixel point and a haptic interaction signal amplitude of the first pixel point.

It can be understood that after the designer performs different haptic interaction settings for different regions of the target video picture, the different regions correspond to haptic interaction signals of different waveforms, and there is no mapping relationship among the haptic interaction signals of different waveforms. At this moment, the haptic interaction information corresponding to pixel points in the same region may be obtained by mapping the haptic interaction signal of the waveform corresponding to the region, and there is no mapping relationship between haptic interaction information corresponding to two pixel points in different regions. That is, the mapping relationship may describe an equation relationship which should be satisfied between the attribute information (such as color information, luminance information and position information) and the haptic interaction signal amplitudes of two pixel points in the same region.

Figure 2:
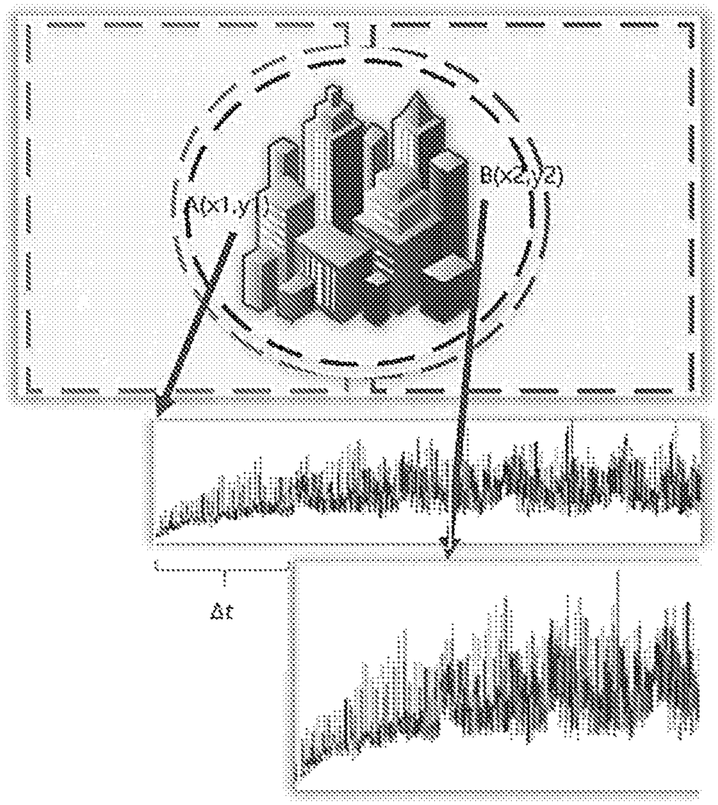
FIG. 2 is a schematic diagram of a target video picture in an embodiment of the present disclosure.

Therefore, when the video production device counts the quantity of the waveforms of the haptic interaction signals in the target video picture, it may first determine the haptic interaction information corresponding to each of the pixel points in the target video picture and detect whether there is a mapping relationship between the haptic interaction information corresponding to two pixel points (such as a first pixel point A and a second pixel point B shown in FIG. 2), i.e., detecting whether the first pixel point A and the second pixel point B satisfy an equation $Wav_2=f(Wav_1, x_1, y_1, X_2, y_2, \Delta t)$, wherein $Wav_1$ and $Wav_2$ are haptic interaction signals corresponding to the first pixel point and the second pixel point, respectively, $(x_1, y_1)$ and $(x_2, y_2)$ are coordinates of the first pixel point and the second pixel point, respectively, $\Delta t$ is a time factor, f (•) represents a mapping relationship, and $f(Wav_1, x_1, y_1, x_2, y_2, \Delta t)$ has a single value. It can be understood that the video production device may automatically divide the video picture regions in the target video picture according to the above-mentioned mapping relationship, or the video picture region may be freely designated by the user.

Dividing the pixel points having a mapping relationship among the corresponding haptic interaction information into the same region may reduce the quantity of region divisions on the basis of ensuring the accuracy of haptic dimension information expression in different regions. The divided regions are taken as the video picture regions corresponding to the haptic signals of the waveforms so that the quantity of the waveforms of the haptic interaction signals one-to-one corresponding to the video picture regions can be determined according to the quantity of the video picture regions.

Figure 3:
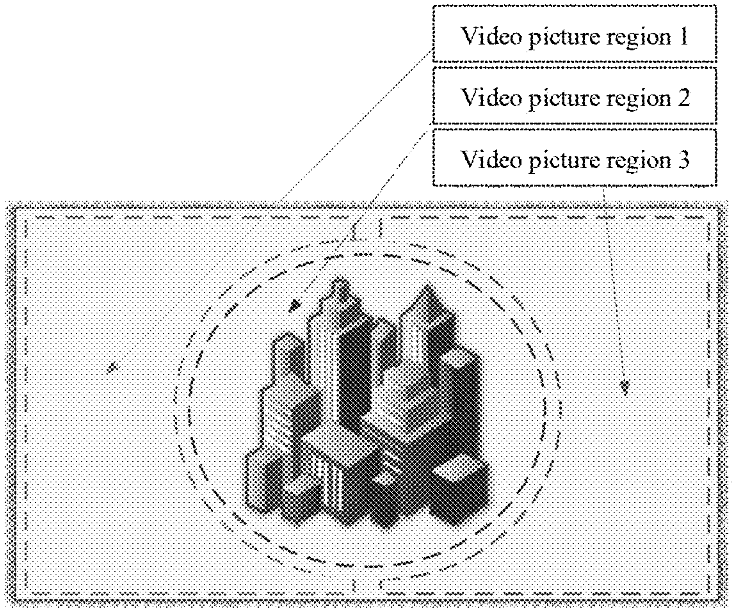
FIG. 3 is a schematic diagram of another target video picture in an embodiment of the present disclosure.

Exemplarily, as shown in FIG. 3, according to the haptic interaction setting of the designer, the target video picture may be divided into three video picture regions (i.e., video picture regions 1, 2, and 3 in FIG. 3), and the other region outside these three video picture regions in the target video picture is a non-video picture region where a haptic interaction setting is not performed by the designer (that is, it is composed of pixel points not corresponding to the haptic interaction information).

As a possible embodiment, for any two pixel points (such as the first pixel point and the second pixel point) in any video picture region, when the above-mentioned attribute information is position information and the mapping relationship is a linear relationship, a haptic interaction signal amplitude of the second pixel point at time t conforms to the following equation:

$$Wav_{(x_2,y_2,t)} = aWav_{(x_1,y_1,t+\Delta t)} + b,$$

wherein $Wav_{(x_2, y_2, t)}$ is the haptic interaction signal amplitude of the second pixel point at time t, $Wav_{(x_1, y_1, t+\Delta t)}$ is a haptic interaction signal amplitude of the first pixel point at time $t+\Delta t$, a and $\Delta t$ are a first set of parameter values for characterizing the linear relationship, and b is a first parameter for characterizing the linear relationship. It can be understood that if the haptic interaction signal amplitudes of the two pixel points conform to the above-mentioned equation, it can be determined that there is a mapping relationship between the haptic interaction information corresponding to the two pixel points.

In the present embodiment, if the linear relationship is a first-degree linear relationship, the first set of parameter values may be characterized by a second set of parameter values used for characterizing the first-degree linear relationship. For example, the first set of parameter values and the second set of parameter values corresponding to the first pixel point and the second pixel point described above may satisfy at least one of the following equations:

$$a = c\Delta x + d\Delta y + e,$$

$$\Delta t = f\Delta x + g\Delta y + h,$$

wherein $\Delta x$ is an offset amount of the first pixel point and the second pixel point in an x direction, $\Delta y$ is an offset amount of the first pixel point and the second pixel point in a y direction, and c, d, e, f, g and h are the second set of parameter values. It can be understood that the above-mentioned second set of parameter values is determined by the designer's haptic interaction settings for the pixel points in the same region.

In the above-mentioned embodiment 1, the basis for dividing different video picture regions is designed, which is beneficial to reducing the repetitive characterization of position-related haptic interaction information.

Embodiment 2

An example of generating the gray-scale information characterization map is described by the present embodiment.

A gray-scale value set corresponding to the waveform of each haptic interaction signal is determined, and the gray-scale information characterization map corresponding to the target video picture is generated according to video picture regions to which pixel points in the target video picture belong and the gray-scale value set corresponding to the waveform of each haptic interaction signal.

It can be understood that since the waveforms of different haptic interaction signals (i.e., different video picture regions) correspond to different gray-scale value sets, for each pixel point in the target video picture, according to the gray-scale value set corresponding to the video picture region where the pixel point is located, the gray-scale value of the pixel point at the same position in the gray-scale information characterization map may be determined, so that the gray-scale information in the generated gray-scale information characterization map may accurately characterize the distribution positions of the video picture regions in the target video picture, thereby the regional haptic dimension information expression of the target video picture is realized.

In one embodiment, the gray-scale information characterization map corresponding to the target video picture may be generated according to a haptic interaction index map corresponding to the target video picture and the gray-scale value set corresponding to the waveform of each haptic interaction signal.

Figure 4:
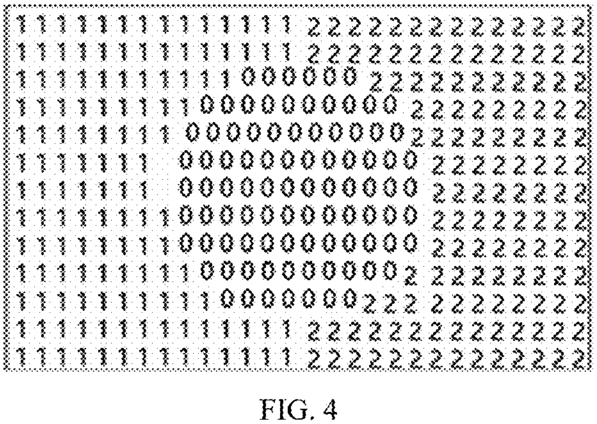
FIG. 4 is a schematic diagram of a haptic interaction index map in an embodiment of the present disclosure.

In the present embodiment, an index value of each of the video picture regions in the target video picture may be determined according to an identification of the waveform of each of the haptic interaction signals, and the haptic interaction index map corresponding to the target video picture is generated according to the index value of each of the video picture regions in the target video picture and video picture regions to which the pixel points in the target video picture belong. As shown in FIG. 4, the index value (such as 0, 1, and 2) corresponding to the video picture region where each pixel point in the target video picture is located may be determined as a pixel value of the pixel point at the same position in the haptic interaction index map.

Subsequently, the pixel value of each pixel point in the haptic interaction index map may be directly taken as a gray-scale value (i.e., the index value of the video picture region) of the pixel point at the same position in the gray-scale information characterization map. That is, the index value of each video picture region is determined as the gray-scale value set corresponding to the waveform of the haptic interaction signal corresponding to each video picture region, so that after subsequently determining gray-scale information corresponding to a haptic interaction operation according to the gray-scale information characterization map, according to the gray-scale information, the haptic interaction information corresponding to the haptic interaction operation may be determined directly from the haptic interaction information corresponding to the waveforms of the plurality of haptic interaction signals corresponding to the target video picture.

As a possible embodiment, after the haptic interaction index map is generated, the pixel value of the pixel point may be converted into the gray-scale value of the pixel point at the same position in the gray-scale information characterization map according to the gray-scale value set corresponding to each pixel point in the haptic interaction index map, thereby the gray-scale characterization of the distribution positions of the video picture regions in the target video picture is realized.

In a specific embodiment, a gray-scale value may be determined from the gray-scale value set corresponding to the waveform of each haptic interaction signal as a gray-scale value of a video picture region corresponding to the waveform of the haptic interaction signal, and then the gray-scale information characterization map corresponding to the target video picture is generated according to the haptic interaction index map corresponding to the target video picture and the gray-scale values corresponding to the video picture regions in the target video picture. At this moment, the gray-scale values of the pixel points corresponding to the same video picture region in the gray-scale information characterization map are the same. A plurality of gray-scale values may also be determined from the gray-scale value set corresponding to the waveform of each haptic interaction signal as the gray-scale values of the video picture region corresponding to the waveform of the haptic interaction signal, and then the gray-scale information characterization map is generated by combining the haptic interaction index map corresponding to the target video picture and feature information (such as position and haptic interaction information) of the pixel points, so that the pixel points corresponding to the same video picture region in the gray-scale information characterization map have different gray-scale values due to different feature information. If the gray-scale value set corresponding to the video picture region contains gray-scale values 0 and 1, the gray-scale values of the pixel points in a gray-scale region corresponding to the video picture region in the gray-scale information characterization map are 0 and 1, and positions of the pixel points in the gray-scale region with a gray-scale value of 0 represent the position distribution of the edge region in the video picture region, and the pixel points in the gray-scale region with a gray-scale value of 1 represent the position distribution of the central region in the video picture region.

It should be noted that, for each pixel point in the non-video picture region, the gray-scale value of the pixel point at the same position in the gray-scale information characterization map may be set as a specific value or a null value.

As a possible embodiment, the step of determining the gray-scale value set corresponding to the waveform of the each of the haptic interaction signals includes any one of the following:

item A-1: dividing a total gray-scale value set according to the quantity of the waveforms of the haptic interaction signals to obtain the gray-scale value set corresponding to the waveform of the each of the haptic interaction signals;

item A-2: dividing the total gray-scale value set according to an attribute value of a video picture region corresponding to the waveform of the each of the haptic interaction signals to obtain the gray-scale value set corresponding to the waveform of the each of the haptic interaction signals; and item A-3: determining gray-scale values different from each other for the waveforms of the haptic interaction signals from the total gray-scale value set as gray-scale value sets corresponding to the waveforms of the haptic interaction signals.

For the item A-1, according to the quantity of the waveforms of the haptic interaction signals, the total gray-scale value set may be equally divided into the same quantity of gray-scale value sets to obtain the gray-scale value set corresponding to the waveform of the each of the haptic interaction signals.

Specifically, a range value of a gray-scale value set corresponding to a waveform of an n-th haptic interaction signal may be determined according to the following equation, and the gray-scale value set corresponding to the waveform of the n-th haptic interaction signal is determined according to the range value of the gray-scale value set:

$$r_n = f\left(\frac{\text{Max}}{n}\right),$$

wherein Max is a maximum gray-scale value in the total gray-scale value set, $r_n$ is the range value of the gray-scale value set corresponding to the waveform of the n-th haptic interaction signal, and f(●) is a rounding function (such as a down rounding function).

In a specific embodiment, after the range value of the gray-scale value set corresponding to the waveform of the n-th haptic interaction signal is obtained according to the above-mentioned equation, the gray-scale value set corresponding to the waveform of the n-th haptic interaction signal may be expressed as $[(n-1)*r_n, n*r_n)$. It can be understood that n may be an index value corresponding to the haptic interaction signal. If the minimum value in the gray-scale value set is taken as the gray-scale value of each pixel point corresponding to the waveform of the haptic interaction signal in the gray-scale information characterization map, the gray-scale information characterization map may be expressed as: $Gray(x,y)=(R(x,y)-1)*r$, wherein Gray(x, y) is a gray-scale value of a pixel point at (x, y) in the gray-scale information characterization map, R(x, y) is a pixel value of a pixel point at (x, y) in the haptic interaction index map, and r is a range value of a gray-scale value set corresponding to the pixel point at (x, y).

For item A-2, the attribute value of the video picture region may be information such as an area ratio of the video picture region in the target video picture. The total gray-scale value set is divided according to the attribute values of the video picture regions, so that the gray-scale value sets corresponding to the waveforms of the haptic interaction signals may have different range values (i.e., different sizes). For example, the gray-scale value set corresponding to the video picture region with a larger area ratio may have a larger range value. At this moment, the size of the range value may be used for characterizing the region ratio of the video picture region, thereby making the divided gray-scale value set more flexible and capable of characterizing more dimension information.

For item A-3, according to the total gray-scale value set, a gray-scale value may be specified for the waveform of each haptic interaction signal to realize the gray-scale characterization of the distribution position of the relevant video picture region, thereby the algorithm is simplified.

In the above-mentioned embodiment 2, the index value of each of the video picture regions in the target video picture is characterized using the gray-scale information in the gray-scale information characterization map, so that the haptic interaction information corresponding to each of the different video picture regions may be effectively expressed.

Embodiment 3

An example of a haptic characterization information stream is described by the present embodiment.

Case 1: when a gray-scale information characterization map corresponding to each of a plurality of video pictures in the target video is generated, a haptic characterization information stream corresponding to the target video is transmitted. The haptic characterization information stream corresponding to the target video at least includes: encoded haptic interaction information corresponding to the plurality of video pictures and encoded gray-scale information characterization maps corresponding to the plurality of video pictures. The plurality of video pictures include the target video picture.

In a specific embodiment, the video production device may generate a gray-scale information characterization map for each video picture of the target video or may, for each video picture following any video picture (such as the target video picture) in the target video, determine video picture regions included in the video picture, and generate a gray-scale information characterization map corresponding to the video picture when the video picture regions included in the video picture are different from the video picture regions included in the target video picture.

The video production device encodes the haptic interaction information corresponding to each of the plurality of video pictures in the target video and the gray-scale information characterization map corresponding to each of the plurality of video pictures to obtain the haptic characterization information stream. For example, the video production device may encode and compress the haptic interaction information and gray-scale information characterization map corresponding to each of the plurality of video pictures, and a binary file generated after the encoding and compression is the haptic characterization information stream.

It can be understood that since the regional haptic interaction is usually set based on the video picture content, and the content of multiple continuous video pictures in the target video usually does not change, i.e., the video picture region distribution of multiple continuous video picture regions does not change. Therefore, after the gray-scale information characterization map corresponding to a certain video picture is generated, a gray-scale information characterization map corresponding to the changed video picture may be generated only when the video picture region distribution of a video picture following the certain video picture changes, thereby the encoding cost is reduced.

In one embodiment, a video playing device (the video playing device and the video production device may be deployed in the same hardware device) acquires and decodes the haptic characterization information stream corresponding to the above-mentioned target video to obtain the gray-scale information characterization maps corresponding to the plurality of video pictures in the target video and encoded haptic interaction information corresponding to the plurality of video pictures.

The gray-scale information characterization map corresponding to a video picture is configured to characterize distribution positions of video picture regions in the video picture, and waveforms of haptic interaction signals corresponding to the video picture correspond to haptic interaction information of video picture regions in the video picture.

The video playing device determines a gray-scale information characterization map corresponding to the target video picture from the gray-scale information characterization maps corresponding to the plurality of video pictures in response to detecting a haptic interaction operation for the target video picture of the plurality of video pictures (for example, a touch assembly detects an operation of the user touching the screen, i.e., sending a corresponding request to the video playing device), determines gray-scale information corresponding to the haptic interaction operation according to the gray-scale information characterization map corresponding to the target video picture and a video picture region where the haptic interaction operation is located (for example, a picture played by a screen region touched by the user), determines haptic interaction information corresponding to the haptic interaction operation from haptic interaction information corresponding to waveforms of a plurality of haptic interaction signals corresponding to the target video picture according to the gray-scale information corresponding to the haptic interaction operation; and triggers a corresponding haptic actuator to output the haptic interaction information corresponding to the haptic interaction operation (for example, playing the corresponding haptic interaction information in the screen region touched by the user).

Case 2: the haptic characterization information stream corresponding to the target video further includes at least one of the following:

- item B-1: a haptic interaction resolution, wherein the haptic interaction resolution is determined according to size information of a unit haptic interaction region touched by a touch element performing a haptic interaction operation;
- item B-2: haptic interaction index maps corresponding to the plurality of video pictures, wherein each of the haptic interaction index maps contains index values of pixel points in a video picture;
- item B-3: mapping relationships corresponding to video picture regions included in the plurality of video pictures, wherein the mapping relationship is used for: determining the haptic interaction signal amplitude of the second pixel point according to the attribute information between the first pixel point and the second pixel point and the haptic interaction signal amplitude of the first pixel point; and
- item B-4: the quantity of the waveforms of the haptic interaction signals in the plurality of video pictures.

For the item B-1, the unit haptic interaction region (such as a region touched by a single finger or a touch pen) is configured to describe a minimum region unit touched by the user when performing a haptic interaction operation, and the size information of the unit haptic interaction region may be size information of a region that can be touched by a single finger or a touch pen. Considering that the haptic interaction resolution is usually greater than a physical pixel resolution, when encoding the gray-scale information characterization map, the video production device may first process the gray-scale information characterization map into a haptic region gray-scale characterization map according to the haptic interaction resolution and then encode the haptic region gray-scale characterization map to reduce the encoding cost, and transmit the haptic interaction resolution and the encoded haptic region gray-scale characterization map to the video playing device. The process of generating the haptic region gray-scale characterization map will be specifically described in embodiment 5 and will not be repeated here.

When information obtained by decoding the haptic characterization information stream corresponding to the target video by the video playing device further includes a haptic interaction resolution, and a plurality of gray-scale information characterization maps obtained by decoding the haptic characterization information stream corresponding to the target video are specifically haptic region gray-scale characterization maps, the video playing device may determine a unit haptic interaction region corresponding to the haptic interaction operation from a haptic region gray-scale characterization map corresponding to the target video picture (i.e., a video picture detected with the haptic interaction operation) according to the haptic interaction resolution. For example, the video playing device may process the haptic region gray-scale characterization map and the target video picture into the same size according to the haptic interaction resolution, then according to the position of the haptic interaction operation in the target video picture, find a unit haptic interaction region at the same position in the haptic region gray-scale characterization map, and then determine the gray-scale information of the unit haptic interaction region corresponding to the haptic interaction operation as the gray-scale information corresponding to the haptic interaction operation.

For the item B-2, after the video production device transmits the haptic interaction index map corresponding to each of the plurality of video pictures to the video playing device through the haptic characterization information stream, the video playing device may determine an index value corresponding to the haptic interaction operation according to the gray-scale information corresponding to the haptic interaction operation and the haptic interaction index map of the target video picture (i.e., the video picture detected with the haptic interaction operation) and determine the haptic interaction information corresponding to the haptic interaction operation from the haptic interaction information corresponding to the waveforms of the plurality of haptic interaction signals corresponding to the target video picture according to the index value corresponding to the haptic interaction operation.

For the item B-3, the video production device may encode and transfer haptic interaction information corresponding to any pixel point in any video picture region as haptic interaction information corresponding to the video picture region, and simultaneously transfer a mapping relationship corresponding to the video picture region, thereby reducing the transmission overhead. The video playing device may then generate a haptic interaction signal corresponding to the haptic interaction operation (for example, generating haptic interaction signals corresponding to pixel points covered by the haptic interaction operation in the video picture region) according to the mapping relationship and haptic interaction information corresponding to the video picture region where the haptic interaction operation is located and trigger a corresponding haptic actuator to output the haptic interaction signal corresponding to the haptic interaction operation.

For example, if a video picture region is designed to simulate the haptic sensation of a stone falling into water, the video picture region may have the characteristics that the haptic sensation of a central region where the stone falls into is significant (i.e., a haptic interaction signal amplitude is large), while the haptic sensation of an edge area is mild (i.e., a haptic interaction signal amplitude is small). In addition, the fluctuation effect also has a delay property (i.e., the timing of outputting the haptic interaction signal from the edge region is later than the timing of outputting the haptic interaction signal from the central region), but the waveforms of the haptic interaction signals output by the central region and the edge region are consistent. That is, due to the influence of the position factor (center/edge), the significant/mild feedback may be fed back by the amplitude change of the waveform, and the delay property is characterized by $\Delta t$.

Therefore, the haptic interaction signals corresponding to the pixel points in the video picture region may be obtained from the haptic interaction information corresponding to the video picture region according to the mapping relationship characterizing the physical position relationship and the delay property (for example, haptic interaction signal amplitudes of pixel points in the edge region at all moments may be obtained according to haptic interaction signal amplitudes of pixel points in the central region at all moments, or the haptic interaction signal amplitudes of pixel points in the central region at all moments may be determined according to the haptic interaction signal amplitudes of pixel points in the edge region at all moments, and therefore $\Delta t$ may be a positive number or a negative number), thereby the information redundancy expression is reduced.

As a possible embodiment, when the mapping relationship is a linear relationship, the linear relationship is characterized by the first set of parameter values and the first parameter, and when the mapping relationship is a first-degree linear relationship, the first set of parameter values is characterized by the second set of parameter values used for characterizing the first-degree linear relationship. Definitions of the first set of parameter values and the second set of parameter values are described in detail in embodiment 1 and will not be repeated here.

For the item B-4, after the video production device transmits the quantity of the waveforms of the haptic interaction signals in the plurality of video pictures to the video playing device through the haptic characterization information stream, the video playing device may allocate a touch actuator to the waveform of each of the haptic interaction signals in the plurality of video pictures according to the quantity of the waveforms of the haptic interaction signals in the plurality of video pictures to realize reasonable allocation of the touch actuators, and can timely trigger a touch actuator to be allocated to a waveform of a haptic interaction signal corresponding to the video picture region where the haptic interaction operation is located to output the haptic interaction information corresponding to the haptic interaction operation.

In the above-mentioned embodiment 3, a coupling technical solution for characterizing and analyzing haptic dimension information of a plurality of video picture regions is designed to meet the requirement of different haptic interaction settings of different regions of the picture.

Embodiment 4

An example of gray-scale information characterization map encoding is described by the present embodiment.

The encoded gray-scale information characterization map corresponding to each of the plurality of video pictures in the haptic characterization information stream is obtained by at least one of the following:

item C-1: when a difference between the gray-scale information characterization maps in a gray-scale information characterization map sequence including the gray-scale information characterization maps corresponding to the plurality of video pictures is less than a preset value, encoding the gray-scale information characterization map sequence using an image encoding mode;

item C-2: encoding the gray-scale information characterization map sequence using a video encoding mode; and item C-3: determining a sequence parameter according to edge information and/or a sequence bit rate corresponding to the gray-scale information characterization map sequence, and encoding the gray-scale information characterization map sequence according to the sequence parameter.

For the item C-1, when the difference between the gray-scale information characterization maps in the gray-scale information characterization map sequence is less than the preset value (for example, the gray-scale information characterization maps are the same), the gray-scale information characterization map sequence may be encoded using the image encoding mode.

For the item C-2, considering that the region where the waveform of each haptic interaction signal in the gray-scale information characterization map is located usually has the characteristics of a smooth region interior and a sharp edge, the gray-scale information characterization map sequence may be encoded using a depth map encoding technology in 3D-HEVC (such as wedge encoding technology and contour segmentation technology). For example, a file obtained after encoding and encapsulating the gray-scale information characterization map sequence in a video sequence encoding mode may include description information of the video sequence (i.e., the gray-scale information characterization map sequence), so that when the player parses the file, the encoding mode (such as MPEG-H HEVC Video) of the gray-scale information characterization map sequence and detailed information (such as resolution, refresh rate, advanced video encoding specification, and other detailed information related to the video sequence) may be known through the description information.

For the item C-3, a sequence parameter, such as a QP value (which is a result quantization parameter encoded by an encoder and is jointly determined by the video resolution, input frame rate, and code rate) used in the encoding process may be adjusted according to requirements, such as whether the edge of each gray-scale information characterization map in the gray-scale information characterization map sequence needs to be sharpened and whether the bit rate of the gray-scale information characterization map is needed.

In the above-mentioned embodiment 4, the gray-scale information characterization map sequence may be encoded using a picture/video encoding mode, but it is necessary to limit the encoding loss accuracy to ensure that a decoding index is not disordered after decoding.

Embodiment 5 an example of the haptic region gray-scale characterization map is described in the present embodiment A haptic region gray-scale characterization map corresponding to each of the plurality of video pictures is generated according to the haptic interaction resolution and the gray-scale information characterization map corresponding to the each of the plurality of video pictures.

In the present embodiment, considering that the haptic interaction resolution is usually greater than the physical pixel resolution, the generated plurality of gray-scale information characterization maps may be reduced according to the haptic interaction resolution to generate the haptic region gray-scale characterization maps corresponding to the plurality of video pictures, and then the haptic region gray-scale characterization maps corresponding to the plurality of video pictures are encoded to obtain the encoded gray-scale information characterization maps corresponding to the plurality of video pictures, thereby the fine granularity of encoding is reduced and the encoding cost is reduced.

In one embodiment, the haptic region gray-scale characterization map corresponding to a single video picture is determined by the following steps:

expanding edges of the gray-scale information characterization map corresponding to the single video picture according to the haptic interaction resolution and a resolution of the gray-scale information characterization map corresponding to the single video picture to ensure that M unit haptic interaction regions having the same size (i.e., conforming to the haptic interaction resolution) can be obtained by dividing subsequently without overlapping;

dividing an edge-expanded gray-scale information characterization map into M unit haptic interaction regions without overlapping according to the haptic interaction resolution, M being a positive integer greater than 1;

determining gray-scale information corresponding to each of the M unit haptic interaction regions according to gray-scale values contained in the each of the M unit haptic interaction regions, for example, determining an average value of the gray-scale values contained in the each of the M unit haptic interaction regions as the gray-scale information corresponding to the each of the M unit haptic interaction regions; and generating the haptic region gray-scale characterization map corresponding to the single video picture according to the gray-scale information corresponding to the each of the M unit haptic interaction regions, for example, combining the gray-scale information corresponding to the M unit haptic interaction regions according to a positional relationship of the M unit haptic interaction regions in the gray-scale information characterization map, thereby the haptic region gray-scale characterization map is obtained.

In one embodiment, gray-scale information corresponding to an m-th unit haptic interaction region among the M unit haptic interaction regions is determined according to the following steps:

counting gray-scale values in the m-th unit haptic interaction region to obtain a gray-scale value corresponding to the m-th unit haptic interaction region, wherein the corresponding gray-scale value may be a value or an average value of a mode of the counted gray-scale values; and determining the gray-scale value corresponding to the m-th unit haptic interaction region as the gray-scale information corresponding to the m-th unit haptic interaction region, thereby it is realized that the gray-scale information characterization map is reduced.

In one embodiment, the step of expanding the edges of the gray-scale information characterization map corresponding to the single video picture according to the haptic interaction resolution and the resolution of the gray-scale information characterization map corresponding to the single video picture includes:

determining a target resolution according to the haptic interaction resolution and the resolution of the gray-scale information characterization map corresponding to the single video picture; and expanding the edges of the gray-scale information characterization map corresponding to the single video picture according to the target resolution.

Figure 5:
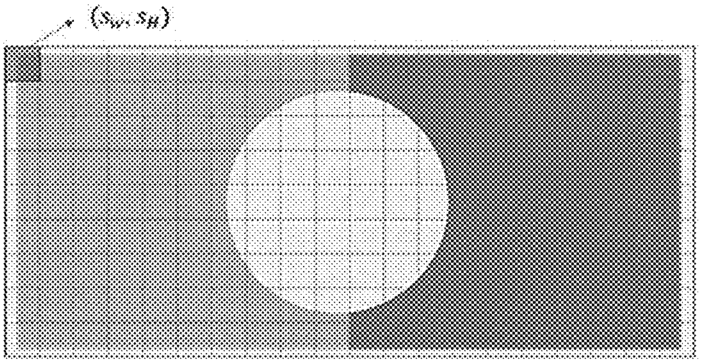
FIG. 5 is a schematic diagram of an expanded gray-scale information characterization map in an embodiment of the present disclosure.

In the present embodiment, as shown in FIG. 5, after the target resolution is determined, pixel points to be expanded in the gray-scale information characterization map may be determined. For example, the pixel points on the left and right edges and the upper and lower edges of the gray-scale information characterization map may be selected to be expanded to make the picture resolution of the gray-scale information characterization map conform to the target resolution, thereby it is ensured that the expanded gray-scale information characterization map can be divided into M unit haptic interaction regions conforming to the haptic interaction resolution ($S_w$, $S_H$) without overlapping, wherein $S_w$ and $S_H$ are a width and a height of the unit haptic interaction region, respectively.

As a possible embodiment, the target resolution may be determined according to the following equation:

$$\begin{cases} W_{new} = \text{ceil}\left(\dfrac{W}{s_w}\right) * s_w \\ H_{new} = \text{ceil}\left(\dfrac{H}{s_H}\right) * s_H \end{cases},$$

wherein $S_w$ and $S_H$ are the width and the height of the unit haptic interaction region, respectively, W and H are used for characterizing the resolution of the gray-scale information characterization map, $W_{new}$ and $H_{new}$ are used for characterizing the target resolution, and new and H ceil(●) is a rounding operation (such as a down rounding operation).

In the above-mentioned embodiment 5, whenever the video picture region in the video picture changes, the corresponding gray-scale information characterization map is generated, which may effectively reduce the encoding cost. The gray-scale information characterization map is scaled according to the haptic interaction resolution, which is beneficial to reducing the amount of gray-scale map information used for describing haptic dimension information in the haptic characterization information stream.

In a second aspect, as shown in FIG. 6, another haptic interaction information processing method is provided by embodiments of the present disclosure, the method includes at least the following steps:

S201: acquiring and decoding a haptic characterization information stream corresponding to a target video to obtain a gray-scale information characterization map corresponding to each of a plurality of video pictures in the target video and encoded haptic interaction information corresponding to the each of the plurality of video pictures, wherein the gray-scale information characterization map corresponding to a video picture is configured to characterize distribution positions of video picture regions in the video picture, and waveforms of haptic interaction signals corresponding to the video picture correspond to haptic interaction information of video picture regions in the video picture;

S202: in response to detecting a haptic interaction operation for a target video picture in the plurality of video pictures, determining a gray-scale information characterization map corresponding to the target video picture from the gray-scale information characterization maps corresponding to the plurality of video pictures;

S203: determining gray-scale information corresponding to the haptic interaction operation according to the gray-scale information characterization map corresponding to the target video picture and a video picture region where the haptic interaction operation is located;

S204: determining haptic interaction information corresponding to the haptic interaction operation from haptic interaction information corresponding to waveforms of a plurality of haptic interaction signals corresponding to the target video picture according to the gray-scale information corresponding to the haptic interaction operation; and

S205: triggering a corresponding haptic actuator to output the haptic interaction information corresponding to the haptic interaction operation.

From the above-mentioned steps, it can be seen that the distribution positions of the video picture regions in the target video picture are characterized by the gray-scale information characterization map in an image grayscale manner, which can accurately describe the regions where the haptic interaction signals of different waveforms are located in the target video picture and is beneficial to realizing different haptic interaction settings in different regions of the picture.

As a possible embodiment, information obtained by decoding the haptic characterization information stream corresponding to the target video further includes: a haptic interaction resolution, wherein the haptic interaction resolution is determined according to size information of a unit haptic interaction region touched by a touch element performing the haptic interaction operation;

a plurality of gray-scale information characterization maps obtained by decoding the haptic characterization information stream corresponding to the target video are specifically haptic region gray-scale characterization maps, and each of the haptic region gray-scale characterization maps is configured to characterize distribution positions corresponding to video picture regions in one video picture;

the step of determining the gray-scale information corresponding to the haptic interaction operation according to the gray-scale information characterization map corresponding to the target video picture and the video picture region corresponding to the haptic interaction operation includes:

determining a unit haptic interaction region corresponding to the haptic interaction operation from a haptic region gray-scale characterization map corresponding to the target video picture according to the haptic interaction resolution; and determining gray-scale information of the unit haptic interaction region corresponding to the haptic interaction operation as the gray-scale information corresponding to the haptic interaction operation.

As a possible embodiment, the information obtained by decoding the haptic characterization information stream corresponding to the target video further includes: haptic interaction index maps corresponding to the plurality of video pictures;

the step of determining the haptic interaction information corresponding to the haptic interaction operation from the haptic interaction information corresponding to the waveforms of the plurality of haptic interaction signals corresponding to the target video picture according to the gray-scale information corresponding to the haptic interaction operation includes:

determining an index value corresponding to the haptic interaction operation according to the gray-scale information corresponding to the haptic interaction operation and a haptic interaction index map of the target video picture; and determining the haptic interaction information corresponding to the haptic interaction operation from the haptic interaction information corresponding to the waveforms of the plurality of haptic interaction signals corresponding to the target video picture according to the index value corresponding to the haptic interaction operation.

As a possible embodiment, the information obtained by decoding the haptic characterization information stream corresponding to the target video further includes: mapping relationships corresponding to video picture regions included in the plurality of video pictures; the method further includes:

generating a haptic interaction signal corresponding to the haptic interaction operation according to a mapping relationship and haptic interaction information corresponding to the video picture region where the haptic interaction operation is located; and the step of triggering the corresponding haptic actuator to output the haptic interaction information corresponding to the haptic interaction operation includes:

triggering the corresponding haptic actuator to output the haptic interaction signal corresponding to the haptic interaction operation.

As a possible embodiment, the information obtained by decoding the haptic characterization information stream corresponding to the target video further includes: a quantity of waveforms of haptic interaction signals in the plurality of video pictures; the method further includes:

allocating a touch actuator to the waveform of each of the haptic interaction signals in the plurality of video pictures according to the quantity of the waveforms of the haptic interaction signals in the plurality of video pictures; and the step of triggering the corresponding haptic actuator to output the haptic interaction information corresponding to the haptic interaction operation includes:

triggering a touch actuator to which a waveform of a haptic interaction signal corresponding to the video picture region where the haptic interaction operation is located being allocated to output the haptic interaction information corresponding to the haptic interaction operation.

An execution subject of the haptic interaction information processing method provided by the embodiment of the present disclosure may be a haptic interaction information processing apparatus. In the embodiment of the present disclosure, the haptic interaction information processing apparatus provided by the embodiment of the present disclosure is described by taking the haptic interaction information processing apparatus performing the haptic interaction information processing method as an example.

In a third aspect, a haptic interaction information processing apparatus is provided by the embodiments of the present disclosure. As shown in FIG. 7, the haptic interaction information processing apparatus 100 includes:

a first counting module 101 configured to count a quantity of waveforms of haptic interaction signals in a target video picture, wherein the target video picture is a video picture in a target video, and the waveform of one haptic interaction signal corresponds to haptic interaction information of one video picture region in the target video picture; and a first generation module 102 configured to generate a gray-scale information characterization map corresponding to the target video picture according to the quantity of the waveforms of the haptic interaction signals, wherein the gray-scale information characterization map is configured to characterize distribution positions of video picture regions in the target video picture.

Optionally, the first counting module 101 includes:

a first counting sub-module configured to determine haptic interaction information corresponding to each of pixel points in the target video picture;

a second counting sub-module configured to determine a region formed by a plurality of pixel points having a mapping relationship among the corresponding haptic interaction information as one video picture region, wherein a region formed by a plurality of pixel points not corresponding to the haptic interaction information is a non-video picture region, and the mapping relationship is used for: determining a haptic interaction signal amplitude of a second pixel point according to attribute information between a first pixel point and the second pixel point and a haptic interaction signal amplitude of the first pixel point; and a third counting sub-module configured to determine the quantity of the waveforms of the haptic interaction signals according to a determined quantity of video picture regions.

Optionally, the attribute information is position information, the mapping relationship is a linear relationship, and a haptic interaction signal amplitude of the second pixel point at time t conforms to the following equation:

$$Wav_{(x_2,y_2,t)} = aWav_{(x_1,y_1,t+\Delta t)} + b,$$

wherein $Wav_{(x_2, y_2, t)}$ is the haptic interaction signal amplitude of the second pixel point at time t, $Wav_{(x_1, y_1, t+\Delta t)}$ is a haptic interaction signal amplitude of the first pixel point at time t+Δt, a and Δt are a first set of parameter values for characterizing the linear relationship, and b is a first parameter for characterizing the linear relationship.

Optionally, the linear relationship is a first-degree linear relationship, and the first set of parameter values is characterized by a second set of parameter values used for characterizing the first-degree linear relationship.

Optionally, the first set of parameter values and the second set of parameter values satisfy at least one of the following equations:

$$a = c\Delta x + d\Delta y + e,$$

$$\Delta t = f\Delta x + g\Delta y + h,$$

wherein Δx is an offset amount of the first pixel point and the second pixel point in an x direction, Δy is an offset amount of the first pixel point and the second pixel point in a y direction, and c, d, e, f, g and h are the second set of parameter values.

Optionally, the first generation module 102 includes:

a first generation sub-module configured to determine a gray-scale value set corresponding to the waveform of each haptic interaction signal; and a second generation sub-module configured to generate the gray-scale information characterization map corresponding to the target video picture according to video picture regions to which pixel points in the target video picture belong and the gray-scale value set corresponding to the waveform of each haptic interaction signal.

Optionally, the first generation sub-module includes:

a first determining module configured to determine an index value of each of the video picture regions as the gray-scale value set corresponding to the waveform of the haptic interaction signal corresponding to the each of the video picture region.

Optionally, the apparatus further includes:

a second generation module configured to generate a haptic interaction index map corresponding to the target video picture according to an index value of the each of the video picture regions in the target video picture and the video picture regions to which the pixel points in the target video picture belong.

The second generation sub-module includes:

a third generation sub-module configured to generate the gray-scale information characterization map corresponding to the target video picture according to the haptic interaction index map corresponding to the target video picture and the gray-scale value set corresponding to the waveform of the each of the haptic interaction signals.

Optionally, the third generation sub-module includes:

a second determining module configured to determine a gray-scale value from the gray-scale value set corresponding to the waveform of the each of the haptic interaction signals as a gray-scale value of a video picture region corresponding to the waveform of the each of the haptic interaction signals; and a fourth generation sub-module configured to generate the gray-scale information characterization map corresponding to the target video picture according to the haptic interaction index map corresponding to the target video picture and gray-scale values corresponding to the video picture regions in the target video picture.

Optionally, the first generation sub-module includes any one of the following:

a first set determining module configured to divide a total gray-scale value set according to the quantity of the waveforms of the haptic interaction signals to obtain the gray-scale value set corresponding to the waveform of the each of the haptic interaction signals;

a second set determining module configured to divide the total gray-scale value set according to an attribute value of a video picture region corresponding to the waveform of the each of the haptic interaction signals to obtain the gray-scale value set corresponding to the waveform of the each of the haptic interaction signals; and a third set determining module configured to determine gray-scale values different from each other for the waveforms of the haptic interaction signals from the total gray-scale value set as gray-scale value sets corresponding to the waveforms of the haptic interaction signals.

Optionally, the first set determining module includes:

a first set determining sub-module configured to determine a range value of a gray-scale value set corresponding to a waveform of an n-th haptic interaction signal according to the following equation, and determining the gray-scale value set corresponding to the waveform of the n-th haptic interaction signal according to the range value of the gray-scale value set:

$$r_n = f\left(\frac{\text{Max}}{n}\right),$$

wherein Max is a maximum gray-scale value in the total gray-scale value set, $r_n$ is the range value of the gray-scale value set corresponding to the waveform of the n-th haptic interaction signal, and f(●) is a rounding function.

Optionally, the apparatus further includes:

a third determining module configured to determine, for each video picture following the target video picture in the target video, a video picture region included in the each video picture; and a third generation module configured to generate a gray-scale information characterization map corresponding to the each video picture when the video picture region included in the each video picture is different from the video picture region included in the target video picture.

Optionally, when a gray-scale information characterization map corresponding to each of a plurality of video pictures in the target video is generated, the apparatus further includes:

a first transmitting module configured to transmit a haptic characterization information stream corresponding to the target video, wherein the haptic characterization information stream corresponding to the target video at least includes: encoded haptic interaction information corresponding to the plurality of video pictures and encoded gray-scale information characterization maps corresponding to the plurality of video pictures, wherein the plurality of video pictures include the target video picture.

Optionally, the first transmitting module includes any one of the following:

a first encoding module configured to, when a difference between the gray-scale information characterization maps in a gray-scale information characterization map sequence including the gray-scale information characterization maps corresponding to the plurality of video pictures is less than a preset value, encode the gray-scale information characterization map sequence using an image encoding mode;

a second encoding module configured to encode the gray-scale information characterization map sequence using a video encoding mode; and a third encoding module configured to determine a sequence parameter according to edge information and/or a sequence bit rate corresponding to the gray-scale information characterization map sequence and encode the gray-scale information characterization map sequence according to the sequence parameter.

Optionally, the second encoding module includes:

a first encoding sub-module configured to encode the gray-scale information characterization map sequence using a depth map encoding technology in 3D-HEVC.

Optionally, the haptic characterization information stream corresponding to the target video further includes at least one of the following:

a haptic interaction resolution, wherein the haptic interaction resolution is determined according to size information of a unit haptic interaction region touched by a touch element performing a haptic interaction operation;

haptic interaction index maps corresponding to the plurality of video pictures, wherein each of the haptic interaction index maps contains index values of pixel points in one video picture;

mapping relationships corresponding to video picture regions included in the plurality of video pictures, wherein each of the mapping relationships is used for: determining the haptic interaction signal amplitude of the second pixel point according to the attribute information between the first pixel point and the second pixel point and the haptic interaction signal amplitude of the first pixel point; and the quantity of the waveforms of the haptic interaction signals in the plurality of video pictures.

Optionally, when the each of the mapping relationships is the linear relationship, the linear relationship is characterized by the first set of parameter values and the first parameter.

Optionally, when the each of the mapping relationships is a first-degree linear relationship, the first set of parameter values is characterized by a second set of parameter values used for characterizing the first-degree linear relationship.

Optionally, the first transmitting module includes:

a fourth generation module configured to generate a haptic region gray-scale characterization map corresponding to the each of the plurality of video pictures according to a haptic interaction resolution and the gray-scale information characterization map corresponding to the each of the plurality of video pictures, wherein the haptic interaction resolution is determined according to size information of a unit haptic interaction region touched by a touch element performing a haptic interaction operation; and a fourth encoding module configured to encode the haptic region gray-scale characterization map corresponding to each of the plurality of video pictures to obtain the encoded gray-scale information characterization map corresponding to the each of the plurality of video pictures.

Optionally, the fourth generation module includes:

a first expansion module configured to expand edges of the gray-scale information characterization map corresponding to the single video picture according to the haptic interaction resolution and a resolution of the gray-scale information characterization map corresponding to the single video picture;

a first division module configured to divide an edge-expanded gray-scale information characterization map into M unit haptic interaction regions without overlapping according to the haptic interaction resolution, M being a positive integer greater than 1;

a fourth determining module configured to determine gray-scale information corresponding to each of the M unit haptic interaction regions according to gray-scale values contained in the each of the M unit haptic interaction regions; and a fifth generation module configured to generate the haptic region gray-scale characterization map corresponding to the single video picture according to the gray-scale information corresponding to the each of the M unit haptic interaction regions.

Optionally, the fourth determining module includes:

a first determining sub-module configured to count gray-scale values in the m-th unit haptic interaction region to obtain a gray-scale value corresponding to the m-th unit haptic interaction region; and a second determining sub-module configured to determine the gray-scale value corresponding to the m-th unit haptic interaction region as the gray-scale information corresponding to the m-th unit haptic interaction region.

Optionally, the first expansion module includes:

a first expansion sub-module configured to determine a target resolution according to the haptic interaction resolution and the resolution of the gray-scale information characterization map corresponding to the single video picture; and a second expansion sub-module configured to expand the edges of the gray-scale information characterization map corresponding to the video picture according to the target resolution.

Optionally, the first expansion sub-module includes:

a fifth determining module configured to determine the target resolution according to the following equation:

$$\begin{cases} W_{new} = \text{ceil}\left(\frac{W}{s_w}\right) * s_w \\ H_{new} = \text{ceil}\left(\frac{H}{s_H}\right) * s_H \end{cases},$$

wherein $S_w$ and $S_H$ are a width and a height of the unit haptic interaction region, respectively, W and H are used for characterizing the resolution of the gray-scale information characterization map, $W_{new}$ and $H_{new}$ are used for characterizing the target resolution, and ceil (●) is a rounding operation.

The haptic interaction information processing apparatus provided by the embodiment of the present disclosure can implement various processes implemented by the haptic interaction information processing method embodiment described in the first aspect and achieve the same technical effect. In order to avoid repetition, the description thereof will not be repeated here.

Figure 8:
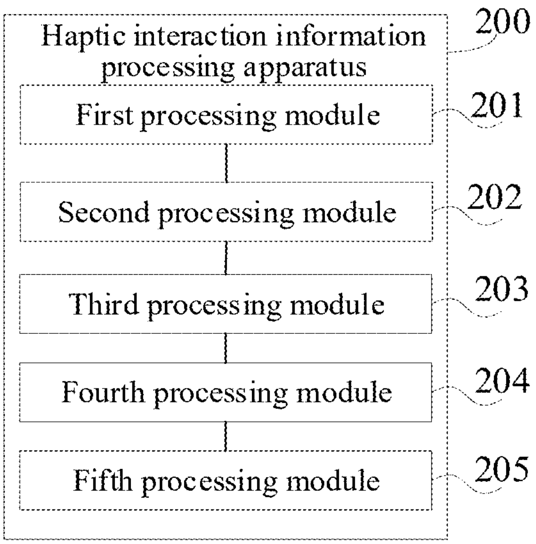
FIG. 8 is a block diagram of a structure of another haptic interaction information processing apparatus in an embodiment of the present disclosure.

In a fourth aspect, another haptic interaction information processing apparatus is provided by the embodiments of the present disclosure. As shown in FIG. 8, the haptic interaction information processing apparatus 200 includes:

a first processing module 201 configured to acquire and decode a haptic characterization information stream corresponding to a target video to obtain a gray-scale information characterization map corresponding to each of a plurality of video pictures in the target video and encoded haptic interaction information corresponding to the each of the plurality of video pictures, wherein the gray-scale information characterization map corresponding to a video picture is configured to characterize distribution positions of video picture regions in the video picture, and waveforms of haptic interaction signals corresponding to a video picture correspond to haptic interaction information of video picture regions in the video picture;

a second processing module 202 configured to, in response to detecting a haptic interaction operation for a target video picture in the plurality of video pictures, determine a gray-scale information characterization map corresponding to the target video picture from the gray-scale information characterization maps corresponding to the plurality of video pictures;

a third processing module 203 configured to determine gray-scale information corresponding to the haptic interaction operation according to the gray-scale information characterization map corresponding to the target video picture and a video picture region where the haptic interaction operation is located;

a fourth processing module 204 configured to determine haptic interaction information corresponding to the haptic interaction operation from haptic interaction information corresponding to waveforms of a plurality of haptic interaction signals corresponding to the target video picture according to the gray-scale information corresponding to the haptic interaction operation; and a fifth processing module 205 configured to trigger a corresponding haptic actuator to output the haptic interaction information corresponding to the haptic interaction operation.

Optionally, information obtained by decoding the haptic characterization information stream corresponding to the target video further includes: a haptic interaction resolution, wherein the haptic interaction resolution is determined according to size information of a unit haptic interaction region touched by a touch element performing a haptic interaction operation;

a plurality of gray-scale information characterization maps obtained by decoding the haptic characterization information stream corresponding to the target video are specifically haptic region gray-scale characterization maps, and each of the haptic region gray-scale characterization maps is configured to characterize distribution positions corresponding to video picture regions in one video picture.

The third processing module 203 includes:

a first processing sub-module configured to determine a unit haptic interaction region corresponding to the haptic interaction operation from a haptic region gray-scale characterization map corresponding to the target video picture according to the haptic interaction resolution; and a second processing sub-module configured to determine gray-scale information of the unit haptic interaction region corresponding to the haptic interaction operation as the gray-scale information corresponding to the haptic interaction operation.

Optionally, the information obtained by decoding the haptic characterization information stream corresponding to the target video further includes: haptic interaction index maps corresponding to the plurality of video pictures.

The fourth processing module 204 includes:

a third processing sub-module configured to determine an index value corresponding to the haptic interaction operation according to the gray-scale information corresponding to the haptic interaction operation and a haptic interaction index map of the target video picture; and a fourth processing sub-module configured to determine the haptic interaction information corresponding to the haptic interaction operation from the haptic interaction information corresponding to the waveforms of the plurality of haptic interaction signals corresponding to the target video picture according to the index value corresponding to the haptic interaction operation.

Optionally, the information obtained by decoding the haptic characterization information stream corresponding to the target video further includes: mapping relationships corresponding to video picture regions included in the plurality of video pictures; the apparatus further includes:

a sixth processing module configured to generate a haptic interaction signal corresponding to the haptic interaction operation according to a mapping relationship and haptic interaction information corresponding to the video picture region where the haptic interaction operation is located; and a seventh processing module configured to trigger the corresponding haptic actuator to output the haptic interaction information corresponding to the haptic interaction operation, including:

an eighth processing module configured to trigger the corresponding haptic actuator to output the haptic interaction signal corresponding to the haptic interaction operation.

Optionally, the information obtained by decoding the haptic characterization information stream corresponding to the target video further includes: a quantity of waveforms of haptic interaction signals in the plurality of video pictures; the apparatus further includes:

a ninth processing module configured to allocate a touch actuator to the waveform of each of the haptic interaction signals in the plurality of video pictures according to the quantity of the waveforms of the haptic interaction signals in the plurality of video pictures.

The eighth processing module includes:

a fifth processing sub-module configured to trigger a touch actuator to which a waveform of a haptic interaction signal corresponding to the video picture region where the haptic interaction operation being located is allocated to output the haptic interaction information corresponding to the haptic interaction operation.

The haptic interaction information processing apparatus provided by the embodiment of the present disclosure can implement various processes implemented by the haptic interaction information processing method embodiment described in the second aspect and achieve the same technical effect. In order to avoid repetition, the description thereof will not be repeated here.

The above-mentioned apparatus embodiment is merely illustrative. The units illustrated as separate components may or may not be physically separated, and the components shown as units may or may not be physical units, i.e., may be located in one place, or may also be distributed over a plurality of network units. Some or all of the modules may be selected according to actual needs to achieve the object of the solutions of the embodiments. A person skilled in the art may understand and implement the embodiments without involving any inventive effort.

Various component embodiments of the present disclosure may be implemented in hardware, or in software modules running on one or more processors, or in a combination thereof. A person skilled in the art will appreciate that some or all of the functions of some or all of the components in a computing processing device according to an embodiment of the present disclosure may be implemented in practice using a microprocessor or a digital signal processor (DSP). The present disclosure may also be implemented as device or apparatus programs (such as computer programs and computer program products) configured to perform a part or all of the methods described herein. Such a program implementing the present disclosure may be stored on a computer-readable medium, or may be in the form of one or more signals. Such a signal may be downloaded from an Internet web site, or provided on a carrier signal, or provided in any other form.

Figure 9:
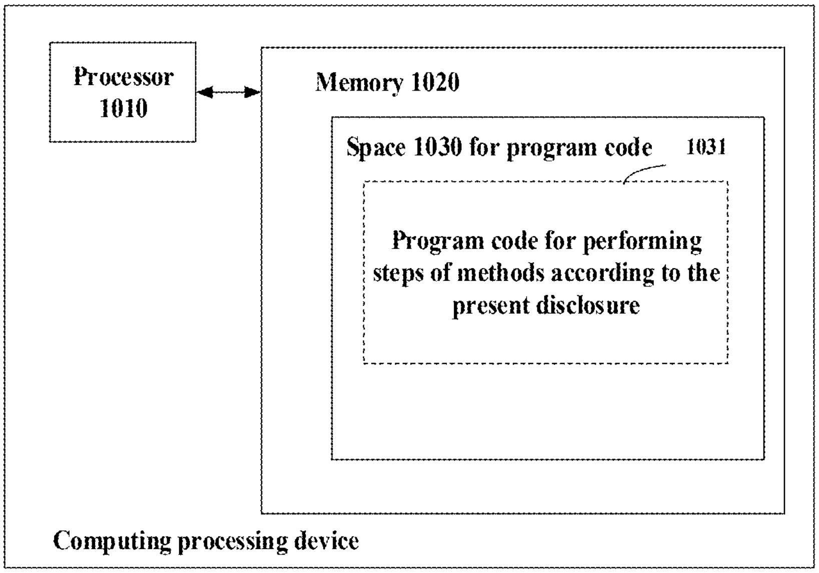
FIG. 9 schematically shows a block diagram of a computing processing device configured to perform a method according to the present disclosure.
Figure 10:
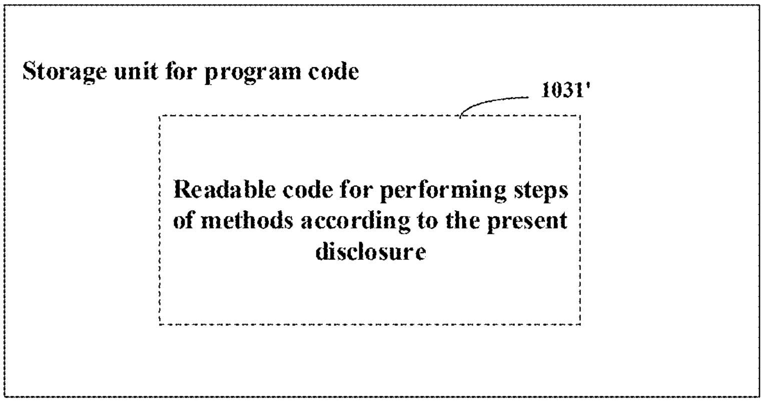
FIG. 10 schematically shows a storage unit configured to hold or carry program code for implementing a method according to the present disclosure.

For example, FIG. 9 shows a computing processing device that may implement the method according to the present disclosure. The computing processing device conventionally includes a processor 1010 and a computer program product or a computer readable medium in the form of a memory 1020. The memory 1020 may be an electronic memory such as a flash memory, an electrically erasable programmable read-only memory (EEPROM), an EPROM, a hard disk, or a ROM. The memory 1020 has a storage space 1030 for program code 1031 for performing any step of the methods described above. For example, the storage space 1030 for program code may include respective program code 1031 for implementing various steps in the above methods. The program code may be read from or written to one or more computer program products. These computer program products include a program code carrier such as a hard disk, a compact disk (CD), a memory card, or a floppy disk. Such a computer program product is typically a portable or fixed storage unit as described with reference to FIG. 10. The storage unit may have a storage segment, a storage space, or the like arranged similarly to the memory 1020 in the computing processing device of FIG. 9. For example, the program code may be compressed in a suitable form. In general, the storage unit includes computer-readable code 1031', i.e., code that may be read by, for example, processors such as the processor 1010. When executed by the computing processing device, the code causes the computing processing device to perform various steps in the methods described above.

A haptic interaction information processing device is also provided by the embodiments of the present disclosure, including a processor and a memory. The memory stores a program or an instruction executable on the processor, and the program or the instruction, when executed by the processor, implements various processes in the above-mentioned haptic interaction information processing method embodiment. In addition, the same technical effects may be achieved, and in order to avoid repetition, the description thereof will not be repeated here.

A readable storage medium having stored thereon a program or an instruction is also provided by the embodiments of the present disclosure, the program or the instruction, when executed by a processor, implements various processes in the above-mentioned haptic interaction information processing method embodiment. In addition, the same technical effects may be achieved, and in order to avoid repetition, the description thereof will not be repeated here.

The processor is a processor in the terminal device described in the above-mentioned embodiment. The readable storage medium includes a computer-readable storage medium, such as a computer read-only memory (ROM), a random access memory (RAM), a magnetic disk, or an optical disk.

Embodiments of the present disclosure further provide a chip, including a processor and a communication interface. The communication interface is coupled to the processor, and the processor is configured to execute a program or an instruction to implement various processes in the above-mentioned haptic interaction information processing method embodiment. In addition, the same technical effects may be achieved, and in order to avoid repetition, the description thereof will not be repeated here.

It can be understood that the chip mentioned in the embodiments of the present disclosure may also be referred to as a system-on-chip, a system chip, a chip system, or the like.

A computer program/program product stored in a storage medium is further provided by the embodiments of the present disclosure. The computer program/program product is executed by at least one processor to implement various processes in the above-mentioned haptic interaction information processing method embodiment. In addition, the same technical effects may be achieved, and in order to avoid repetition, the description thereof will not be repeated here.

A haptic interaction information processing system is further provided by the embodiments of the present disclosure, including: a video production device and a video playing device. The video production device is configured to perform the steps of the haptic interaction information processing method described in the first aspect, and the video playing device is configured to perform the steps of the haptic interaction information processing method described in the second aspect.

It should be noted that, as used herein, the terms "include", "contain", or any other variation thereof are intended to cover a non-exclusive inclusion so that a process, method, article, or apparatus that includes a list of elements does not include only those elements but may include other elements not expressly listed or inherent to such process, method, article, or apparatus. An element limited by the phrase "include a . . . " does not, without more constraints, preclude the existence of additional identical elements in the process, method, article, or apparatus that includes the element. Furthermore, it should be noted that the methods and apparatuses in the embodiments of the present disclosure are not limited to performing functions in the order shown or discussed. The functions may also be performed in a substantially simultaneous manner or in a reverse order depending on the functions involved. For example, the described methods may be performed in an order different from that described, and various steps may be added, omitted, or combined. In addition, features described with reference to certain examples may be combined in other examples.

Through the description of the above embodiments, it will be clear to a person skilled in the art that the methods of the above-mentioned embodiments may be implemented by software and a necessary general hardware platform, and of course by hardware, but in many cases the former is the preferred embodiment. Based on such an understanding, the technical solution of the present disclosure essentially or in part contributing to the related art may be embodied in the form of a computer software product. The computer software product is stored in a storage medium (such as the ROM/RAM, magnetic disk, and optical disk) including several instructions for causing a terminal (which may be a mobile phone, a computer, a server, an air conditioner, or a network device, etc.) to perform the methods according to various embodiments of the present disclosure.

The embodiments of the present disclosure are described above with reference to the accompanying drawings, but the present disclosure is not limited to the above-mentioned specific embodiments. The above-mentioned embodiments are merely illustrative and not restrictive. A person skilled in the art, inspired by the present disclosure and without departing from the purpose of the present disclosure and the scope of the claims, may also make many forms, all of which fall within the scope of the present disclosure.

The invention claimed is:

1. A haptic interaction information processing method, comprising:

counting a quantity of waveforms of haptic interaction signals in a target video picture, wherein the target video picture is a video picture in a target video, and the waveform of one haptic interaction signal corresponds to haptic interaction information of one video picture region in the target video picture; and generating a gray-scale information characterization map corresponding to the target video picture according to the quantity of the waveforms of the haptic interaction signals, wherein the gray-scale information characterization map is configured to characterize distribution positions of video picture regions in the target video picture;

the step of generating the gray-scale information characterization map corresponding to the target video picture according to the quantity of the waveforms of the haptic interaction signals comprises:

determining a gray-scale value set corresponding to the waveform of each haptic interaction signal; and generating the gray-scale information characterization map corresponding to the target video picture according to video picture regions to which pixel points in the target video picture belong and the gray-scale value set corresponding to the waveform of each haptic interaction signal.

2. The method according to claim 1, wherein the step of counting the quantity of the waveforms of the haptic interaction signals in the target video picture comprises:

determining haptic interaction information corresponding to each of pixel points in the target video picture;

determining a region formed by a plurality of pixel points having a mapping relationship among the corresponding haptic interaction information as one video picture region, wherein a region formed by a plurality of pixel points not corresponding to the haptic interaction information is a non-video picture region, and the mapping relationship is used for: determining a haptic interaction signal amplitude of a second pixel point according to attribute information between a first pixel point and the second pixel point and a haptic interaction signal amplitude of the first pixel point; and determining the quantity of the waveforms of the haptic interaction signals according to a determined quantity of video picture regions.

3. The method according to claim 2, wherein the attribute information is position information, the mapping relationship is a linear relationship, and a haptic interaction signal amplitude of the second pixel point at time t conforms to the following equation:

$$Wav_{(x_2,y_2,t)} = aWav_{(x_1,y_1,t+\Delta t)} + b,$$

wherein $Wav_{(x_2,\, y_2,\, t)}$ is the haptic interaction signal amplitude of the second pixel point at the time t, $Wav_{(x_1,\, y_1,\, t+\Delta t)}$ is a haptic interaction signal amplitude of the first pixel point at time t+Δt, a and Δt are a first set of parameter values for characterizing the linear relationship, and b is a first parameter for characterizing the linear relationship.

4. The method according to claim 3, wherein the linear relationship is a first-degree linear relationship, and the first set of parameter values is characterized by a second set of parameter values used for characterizing the first-degree linear relationship.

5. The method according to claim 4, wherein the first set of parameter values and the second set of parameter values satisfy at least one of the following equations:

$$a = c\Delta x + d\Delta y + e,$$

$$\Delta t = f\Delta x + g\Delta y + h,$$

wherein Δx is an offset amount of the first pixel point and the second pixel point in an x direction, Δy is an offset amount of the first pixel point and the second pixel point in a y direction, and c, d, e, f, g and h are the second set of parameter values.

6. The method according to claim 3, wherein the method further comprises:

determining, for each video picture following the target video picture in the target video, a video picture region comprised in the each video picture; and generating a gray-scale information characterization map corresponding to the each video picture when the video picture region comprised in the each video picture is different from the a video picture region comprised in the target video picture.

7. The method according to claim 6, wherein when a gray-scale information characterization map corresponding to each of a plurality of video pictures in the target video is generated, the method further comprises:

transmitting a haptic characterization information stream corresponding to the target video, wherein the haptic characterization information stream corresponding to the target video at least comprises: encoded haptic interaction information corresponding to the plurality of video pictures and encoded gray-scale information characterization maps corresponding to the plurality of video pictures, wherein the plurality of video pictures comprise the target video picture.

8. The method according to claim 7, wherein the encoded gray-scale information characterization map corresponding to the each of the plurality of video pictures is obtained by the following steps:

when a difference between the gray-scale information characterization maps in a gray-scale information characterization map sequence comprising the gray-scale information characterization maps corresponding to the plurality of video pictures is less than a preset value, encoding the gray-scale information characterization map sequence using an image encoding mode;

or encoding the gray-scale information characterization map sequence using a video encoding mode;

or determining a sequence parameter according to edge information and/or a sequence bit rate corresponding to the gray-scale information characterization map sequence, and encoding the gray-scale information characterization map sequence according to the sequence parameter.

9. The method according to claim 7, wherein the haptic characterization information stream corresponding to the target video further comprises at least one of the following:

a haptic interaction resolution, wherein the haptic interaction resolution is determined according to size information of a unit haptic interaction region touched by a touch element performing a haptic interaction operation;

haptic interaction index maps corresponding to the plurality of video pictures, wherein each of the haptic interaction index maps contains index values of pixel points in one video picture;

mapping relationships corresponding to video picture regions comprised in the plurality of video pictures, wherein each of the mapping relationships is used for: determining the haptic interaction signal amplitude of the second pixel point according to the attribute information between the first pixel point and the second pixel point and the haptic interaction signal amplitude of the first pixel point; and the quantity of the waveforms of the haptic interaction signals in the plurality of video pictures.

10. The method according to claim 9, wherein when the attribute information is the position information and the each of the mapping relationships is the linear relationship, the linear relationship is characterized by the first set of parameter values and the first parameter.

11. The method according to claim 1, wherein the step of determining the gray-scale value set corresponding to the waveform of the each haptic interaction signal comprises:

determining an index value of each of the video picture regions as the gray-scale value set corresponding to the waveform of the haptic interaction signal corresponding to the each of the video picture regions.

12. The method according to claim 1, wherein the method further comprises:

generating a haptic interaction index map corresponding to the target video picture according to an index value of the each of the video picture regions in the target video picture and the video picture regions to which the pixel points in the target video picture belong; and the step of generating the gray-scale information characterization map corresponding to the target video picture according to the video picture regions to which the pixel points in the target video picture belong and the gray-scale value set corresponding to the waveform of the each of the haptic interaction signals comprises:

generating the gray-scale information characterization map corresponding to the target video picture according to the haptic interaction index map corresponding to the target video picture and the gray-scale value set corresponding to the waveform of the each of the haptic interaction signals.

13. The method according to claim 12, wherein the step of generating the gray-scale information characterization map corresponding to the target video picture according to the haptic interaction index map corresponding to the target video picture and the gray-scale value set corresponding to the waveform of the each of haptic interaction signals comprises:

determining a gray-scale value from the gray-scale value set corresponding to the waveform of the each of the haptic interaction signals as a gray-scale value of a video picture region corresponding to the waveform of the each of the haptic interaction signals; and generating the gray-scale information characterization map corresponding to the target video picture according to the haptic interaction index map corresponding to the target video picture and gray-scale values corresponding to the video picture regions in the target video picture.

14. The method according to claim 1, wherein the step of determining the gray-scale value set corresponding to the waveform of the each of the haptic interaction signals comprises any one of the following:

dividing a total gray-scale value set according to the quantity of the waveforms of the haptic interaction signals to obtain the gray-scale value set corresponding to the waveform of the each of the haptic interaction signals;

dividing the total gray-scale value set according to an attribute value of a video picture region corresponding to the waveform of the each of the haptic interaction signals to obtain the gray-scale value set corresponding to the waveform of the each of the haptic interaction signals; and determining gray-scale values different from each other for the waveforms of the haptic interaction signals from the total gray-scale value set as gray-scale value sets corresponding to the waveforms of the haptic interaction signals.

15. The method according to claim 14, wherein the step of dividing the total gray-scale value set according to the quantity of the waveforms of the haptic interaction signals to obtain the gray-scale value set corresponding to the waveform of the each of the haptic interaction signals comprises:

determining a range value of a gray-scale value set corresponding to a waveform of an n-th haptic interaction signal according to the following equation, and determining the gray-scale value set corresponding to the waveform of the n-th haptic interaction signal according to the range value of the gray-scale value set:

$$r_n = f\left(\frac{\mathrm{Max}}{n}\right),$$

wherein Max is a maximum gray-scale value in the total gray-scale value set, $r_n$ is the range value of the gray-scale value set corresponding to the waveform of the n-th haptic interaction signal, and f(●) is a rounding function.

16. A haptic interaction information processing device, comprising a processor and a memory; the memory storing a program or an instruction executable on the processor, and the program or the instruction, when executed by the processor, implementing the steps of the haptic interaction information processing method according to claim 1.

17. A computing processing device, comprising:

a memory storing a computer-readable code; and one or more processors; when the computer-readable code is executed by the one or more processors, the computing processing device performing the haptic interaction information processing method according to claim 1.

18. A haptic interaction information processing method, comprising:

acquiring and decoding a haptic characterization information stream corresponding to a target video to obtain a gray-scale information characterization map corresponding to each of a plurality of video pictures in the target video and encoded haptic interaction information corresponding to the each of the plurality of video pictures, wherein the gray-scale information characterization map corresponding to a video picture is configured to characterize distribution positions of video picture regions in the video picture, and waveforms of haptic interaction signals corresponding to the video picture correspond to haptic interaction information of video picture regions in the video picture;

in response to detecting a haptic interaction operation for a target video picture in the plurality of video pictures, determining a gray-scale information characterization map corresponding to the target video picture from the gray-scale information characterization maps corresponding to the plurality of video pictures;

determining gray-scale information corresponding to the haptic interaction operation according to the gray-scale information characterization map corresponding to the target video picture and a video picture region where the haptic interaction operation is located;

determining haptic interaction information corresponding to the haptic interaction operation from haptic interaction information corresponding to waveforms of a plurality of haptic interaction signals corresponding to the target video picture according to the gray-scale information corresponding to the haptic interaction operation; and triggering a corresponding haptic actuator to output the haptic interaction information corresponding to the haptic interaction operation.

19. A haptic interaction information processing device, comprising a processor and a memory; the memory storing a program or an instruction executable on the processor, and the program or the instruction, when executed by the processor, implementing the steps of the haptic interaction information processing method according to claim 18.

* * * * *